United States Patent
Tsuda et al.

(10) Patent No.: US 9,559,557 B2
(45) Date of Patent: Jan. 31, 2017

(54) ROTATING ELECTRICAL MACHINE

(75) Inventors: Toshihiro Tsuda, Tokyo (JP); Mitsuhiro Kawamura, Tokyo (JP); Tadashi Fukami, Ishikawa (JP); Kazuo Shima, Ishikawa (JP)

(73) Assignees: Toshiba Mitsubishi-Electric Industrial Systems Corporation, Tokyo (JP); Kanazawa Institute of Technology, Nonoichi-shi (JP)

( * ) Notice: Subject to any disclaimer, the term of this patent is extended or adjusted under 35 U.S.C. 154(b) by 482 days.

(21) Appl. No.: 14/131,093

(22) PCT Filed: Aug. 11, 2011

(86) PCT No.: PCT/JP2011/004557
§ 371 (c)(1),
(2), (4) Date: May 21, 2014

(87) PCT Pub. No.: WO2013/021428
PCT Pub. Date: Feb. 14, 2013

(65) Prior Publication Data
US 2014/0292134 A1 Oct. 2, 2014

(51) Int. Cl.
*H02K 3/16* (2006.01)
*H02K 19/10* (2006.01)
(Continued)

(52) U.S. Cl.
CPC ........ *H02K 3/16* (2013.01); *H02K 3/00* (2013.01); *H02K 3/20* (2013.01); *H02K 3/28* (2013.01);
(Continued)

(58) Field of Classification Search
CPC .............. H02K 3/00; H02K 3/16; H02K 3/28; H02K 3/30; H02K 3/32; H02K 3/38; H02K 3/46; H02K 3/52; H02K 3/522; H02K 3/18; H02K 3/20; H02K 19/06; H02K 19/10; H02K 19/103; H02K 19/12; H02K 19/26; H02K 19/30; H02K 19/28; H02K 19/32; H02K 19/20; H02K 49/102; H02K 49/104; H02K 49/106; H02K 49/108; H02K 7/1838; H02K 2213/03
(Continued)

(56) References Cited

U.S. PATENT DOCUMENTS

| | | | | |
|---|---|---|---|---|
| 2,300,520 A | * | 11/1942 | Pollard | H02K 3/20 310/183 |
| 2,411,002 A | * | 11/1946 | Rudenberg | H02K 3/16 310/183 |
| 2013/0181568 A1 | * | 7/2013 | Bangura | H02K 19/22 310/183 |

FOREIGN PATENT DOCUMENTS

| | | |
|---|---|---|
| JP | 49-113112 | 10/1974 |
| JP | 50-78924 | 7/1975 |

(Continued)

OTHER PUBLICATIONS

International Search Report issued Sep. 6, 2011, in PCT/JP11/004557 filed Aug. 11, 2011.
U.S. Appl. No. 14/122,610, filed Nov. 26, 2013, Tsuda, et al.

*Primary Examiner* — Terrance Kenerly
*Assistant Examiner* — Alexander Singh
(74) *Attorney, Agent, or Firm* — Oblon, McClelland, Maier & Neustadt, L.L.P.

(57) ABSTRACT

This rotating electrical machine has a rotor, stator core, field windings for multiple poles, and armature windings for the multiple poles. The rotor is rotatably supported about a shaft. Convex-shaped multiple salient pole sections are formed on the outer circumference of the rotor while arranged in the circumferential direction. The stator core is provided along the outer circumference of the rotor with an air gap from the rotor. Convex-shaped multiple teeth are formed on the inner circumference of the stator core while arranged in the (Continued)

circumferential direction. The field windings for the multiple poles are wound around each of the multiple teeth while insulated from the field windings.

7 Claims, 9 Drawing Sheets

(51) Int. Cl.
    *H02K 3/28*     (2006.01)
    *H02K 3/46*     (2006.01)
    *H02K 19/06*     (2006.01)
    *H02K 3/20*     (2006.01)
    *H02K 19/20*     (2006.01)
    *H02K 3/00*     (2006.01)
    *H02K 7/18*     (2006.01)

(52) U.S. Cl.
    CPC ................ *H02K 3/46* (2013.01); *H02K 19/06* (2013.01); *H02K 19/10* (2013.01); *H02K 19/20* (2013.01); *H02K 7/1838* (2013.01); *H02K 2213/03* (2013.01)

(58) Field of Classification Search
    USPC ....... 310/183, 184, 198, 180, 179, 132, 133, 310/134, 140, 142, 144, 146, 149, 182, 310/197, 203, 210, 216.095
    See application file for complete search history.

(56) References Cited

FOREIGN PATENT DOCUMENTS

| | | |
|---|---|---|
| JP | 2002-252948 | 9/2002 |
| JP | 2003-180059 | 6/2003 |
| JP | 2009-535012 | 9/2009 |

* cited by examiner

| $p_f/p_a=1.5$ | | | $p_f/p_a=1.2$ | | | $p_f/p_a=1.125$ | | |
|---|---|---|---|---|---|---|---|---|
| $p_f$ | $p_a$ | $p_r$ | $p_f$ | $p_a$ | $p_r$ | $p_f$ | $p_a$ | $p_r$ |
| 12 | 8 | 10 | 24 | 20 | 22 | 36 | 32 | 34 |
| 18 | 12 | 15 | 36 | 30 | 33 | 54 | 48 | 51 |
| 24 | 16 | 20 | 48 | 40 | 44 | 72 | 64 | 68 |
| 30 | 20 | 25 | 60 | 50 | 55 | 90 | 80 | 85 |
| 36 | 24 | 30 | 72 | 60 | 66 | 108 | 96 | 102 |
| 42 | 28 | 35 | 84 | 70 | 77 | 126 | 112 | 119 |
| 48 | 32 | 40 | 96 | 80 | 88 | 144 | 128 | 136 |
| ... | ... | ... | ... | ... | ... | ... | ... | ... |

ROTATING ELECTRICAL MACHINE

TECHNICAL FIELD

The present invention relates to a rotating electrical machine in which the stator has the field windings.

BACKGROUND ART

In general, a generator's output power increases as the number of revolutions (rotating speed) of the rotor increases. For example, a large capacity wind power generation system inputs thereto a rotational energy of a propeller. Usually, a rotating speed of the propeller is significantly low. When such a propeller is directly connected to a generator for power generation, the size of the generator needs to be huge. There is known an approach in which, in order to reduce the size of the generator, the rotating speed of the propeller is increased by a mechanical speed-up device having a gear.

In recent years, the capacity of the wind power generation has increased and, therefore, the above-mentioned mechanical speed-up device may fail to meet a required power generation capacity.

There is known, as an approach for solving this problem, a technology disclosed in, e.g., Patent Document 1 that uses a magnetic gear to obtain speed-up effect. The magnetic gear is a technology comparatively similar to the generator, allowing integration of the magnetic gear and the generator. A rotating electrical machine having the magnetic gear speeds up a rotating magnetic field using the magnetic gear and generates power in a three-phase armature winding based on the rotating magnetic field.

PRIOR ART DOCUMENTS

Patent Documents

Patent Document 1: Jpn. PCT National Publication No. 2009-535012

SUMMARY OF THE INVENTION

Problem to be Solved by the Invention

However, in a generator using a magnetic gear as disclosed in Patent Document 1, a rotor structure is complicated. The complicated structure of the rotor increases manufacturing cost. If load torque unexpectedly occurs during the rotation of the rotor, the rotation speed may change due to the load torque.

The present invention has been made in view of the above situation, and an object thereof is to obtain speed-up effect in a stable manner by using the magnetic gear in a rotating electrical machine having a simpler structure.

Means for Solving the Problem

According to an embodiment, there is provided a rotating electrical machine comprising: a rotor which is rotatably supported and which has, on its outer circumference, a plurality of convex-shaped salient pole sections arranged in a circumferential direction; a stator core which is disposed around the outer circumference of the rotor with an air gap formed therebetween and which has, on its inner circumference, a plurality of convex-shaped teeth arranged in a circumferential direction, with axial-direction grooves that are formed on radial-direction inner sides of the teeth and open to both axial-direction sides and radial-direction outer sides and extend in the axial-direction; field windings each of which is wound around each of the plurality of the teeth, each of the field windings forming a pole; and armature windings each of which is wound around each of the plurality of the teeth so as to be insulated from the field windings, forming a plurality of poles, a plurality of conductor rods that are disposed in each of the axial-direction grooves; and a plurality of conductor connection members that are disposed on each of both sides of axial-direction outer sides of the rotor, and each of which is connected to axial-direction end portions of a predetermined number of the conductor rods, and which make up one closed electrical circuit along with a plurality of the conductor rods, wherein the number of the teeth and the number of the poles formed by the field windings are equal, and a ratio of the number of the poles formed by the field windings to the number of the poles formed by the armature windings is equal to a predetermined ratio, and the number of the salient pole sections formed in the rotor is equal to $(p_f+p_a)/2$, where $p_f$ is the number of the poles formed by the field windings, and $p_a$ is the number of the poles formed by the armature windings.

Advantage of the Invention

According to the present invention, it is possible to obtain speed-up effect in a stable manner by using the magnetic gear in a rotating electrical machine having a simpler structure.

BRIEF DESCRIPTION OF THE DRAWINGS

FIG. 5($a$) is a graph illustrating relationship between time and load torque when there is no damper winding of FIG. 3; and FIG. 5($b$) is a graph illustrating relationship between time and rotor's rotation speed, and illustrates a situation where the rotation speed is changing due to load torque of FIG. 5($a$).

FIG. 6($a$) is a graph illustrating relationship between time and load torque when there is a damper winding of FIG. 3; and FIG. 6($b$) is a graph illustrating relationship between time and rotor's rotation speed, and illustrating situation where the rotation speed is changing due to load torque of FIG. 6($a$).

EMBODIMENTS FOR CARRYING OUT THE INVENTION

Embodiments of a rotating electrical machine according to the present invention will be described below with reference to the drawings.

First Embodiment

Figure 1:
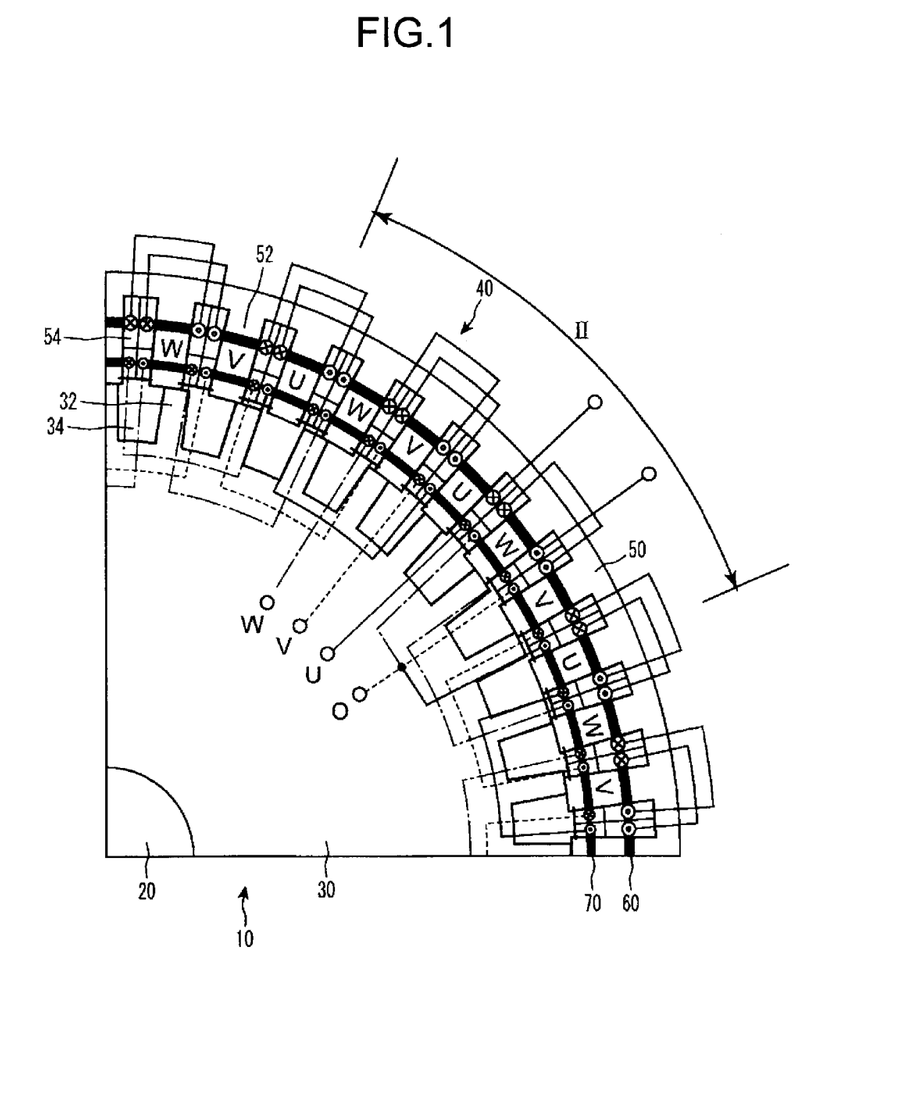
FIG. 1 is a partial cross-sectional view schematically illustrating a traverse cross-section of a quarter of a rotating electrical machine according to a first embodiment of the present invention.
Figure 2:
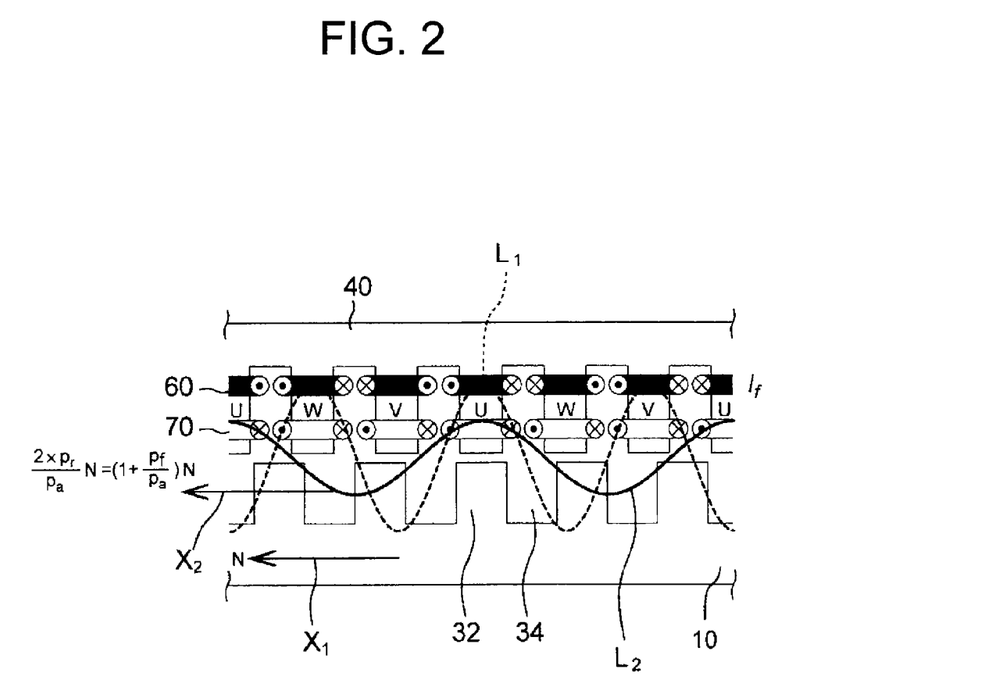
FIG. 2 is a schematic cross-sectional view of a stator and a rotor within range II of FIG. 1, which is obtained by linearly developing a circumferential direction as viewed from an axial direction.

A first embodiment will be described using FIGS. 1 and 2. FIG. 1 is a partial cross-sectional view schematically illustrating a cross-section of a quarter of a rotating electrical machine according to the present embodiment. FIG. 2 is a schematic cross-sectional view of a stator 40 and a rotor 10 within range II of FIG. 1, which is obtained by linearly developing a circumferential direction as viewed from an axial direction. Neither FIG. 1 nor 2 show a damper winding 75 and the like.

Figure 3:
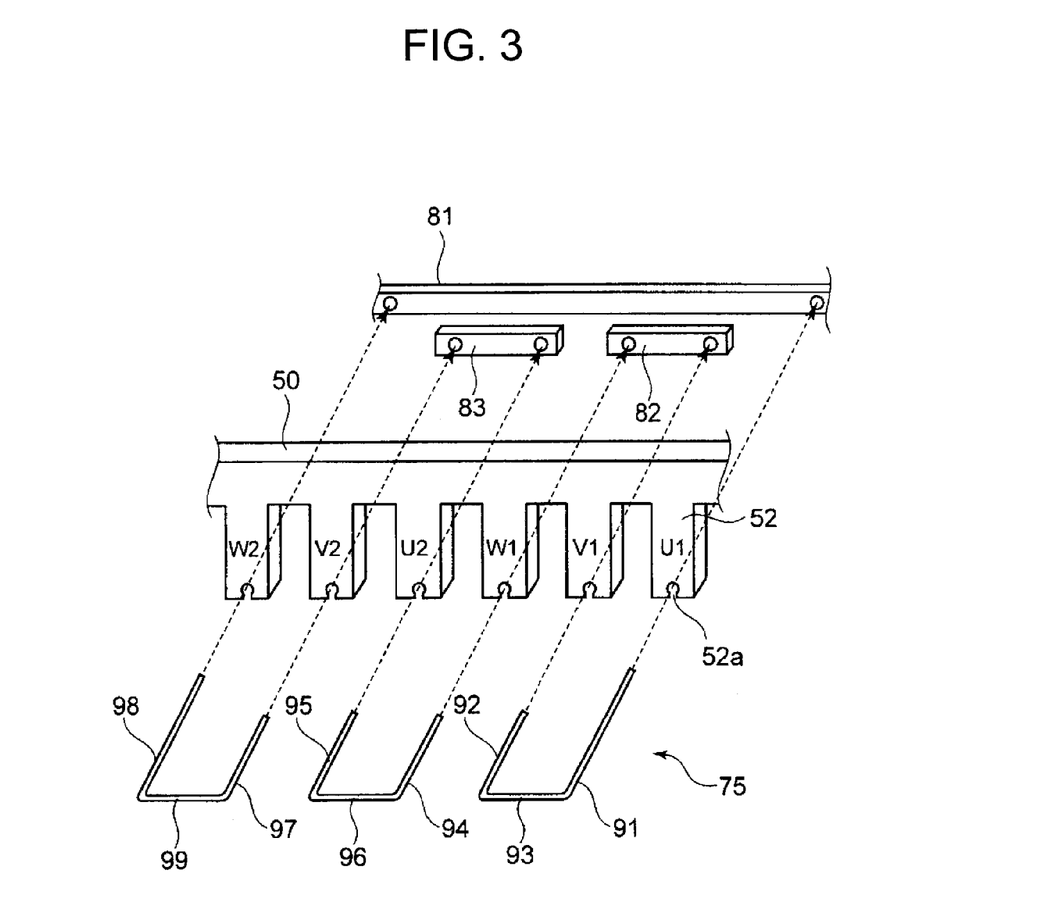
FIG. 3 is a schematic perspective view illustrating the configuration of a stator core and damper winding according to the embodiment of FIG. 1.
Figure 4:
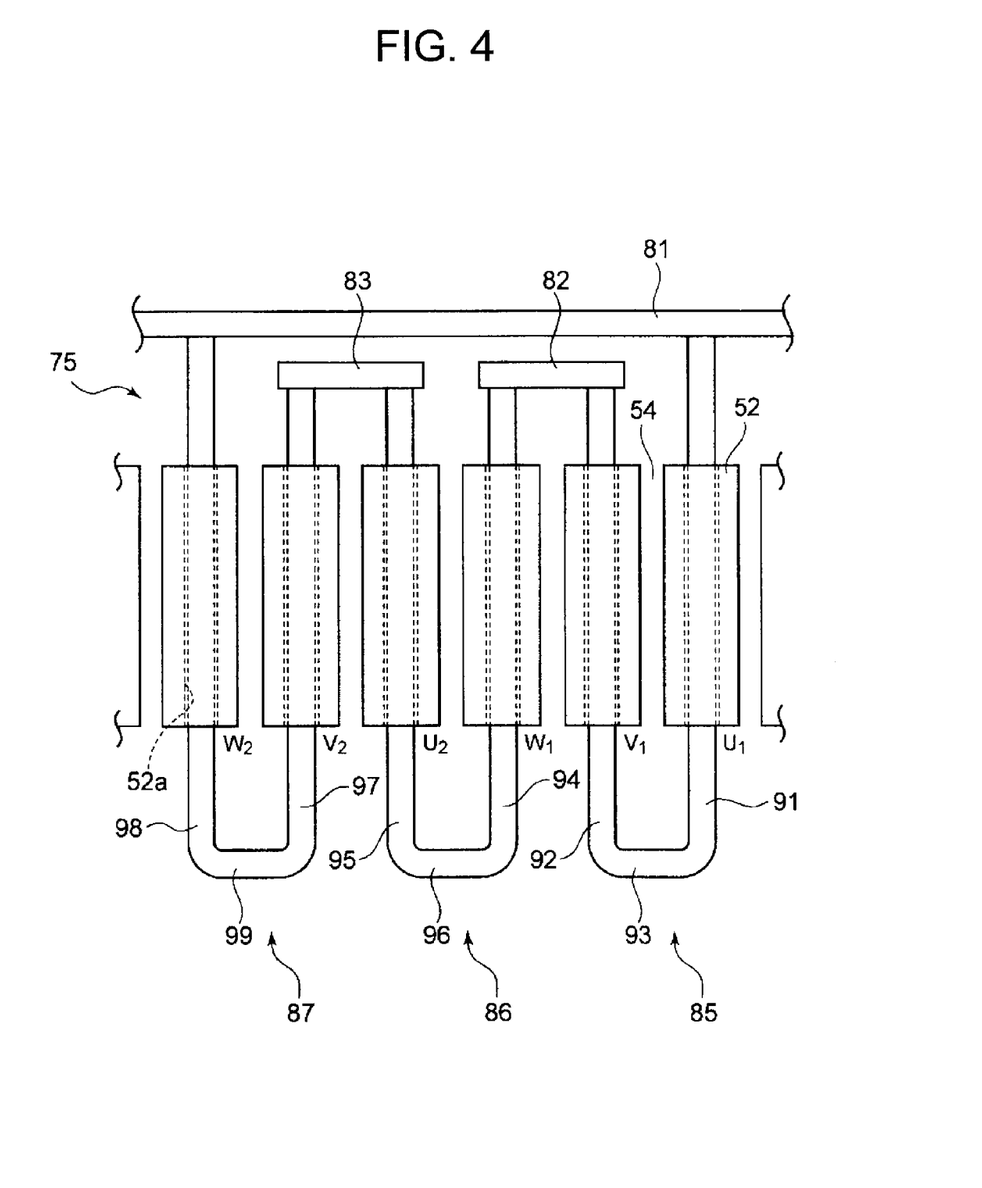
FIG. 4 is a top view of FIG. 3.

FIG. 3 is a schematic perspective view illustrating the configuration of a stator core 50 and a damper winding 75 according to the embodiment of FIG. 1. FIG. 4 is a top view of FIG. 3. FIGS. 3 and 4 are schematic diagrams, showing the circumferential direction of the stator core 50 and the like linearly while not showing field windings 60 and armature windings 70.

FIG. 5(a) is a graph illustrating relationship between time and load torque when there is no damper winding 75 of FIG. 3. FIG. 5(b) is a graph illustrating relationship between time and rotation speed of rotor 10, and illustrates a situation where the rotation speed is changing due to load torque of FIG. 5(a). FIG. 6(a) is a graph illustrating relationship between time and load torque when there is a damper winding 75 of FIG. 3. FIG. 6(b) is a graph illustrating relationship between time and rotation speed of rotor 10, and illustrating situation where the rotation speed is changing due to load torque of FIG. 6(a).

First, a configuration of the rotating electrical machine according to the present embodiment will be described. The rotating electrical machine is a three-phase synchronous generator and includes a rotor 10 and a stator 40. The rotor 10 and the stator 40 are disposed inside a housing (not illustrated).

The rotor 10 is a salient-pole type rotor not provided with a winding and includes a main shaft 20 and a rotor core 30. The main shaft 20 extends coaxially with a rotation axis and rotatably supported by bearings (not illustrated) mounted in the housing.

The rotor core 30 is formed by laminating a plurality of silicon steel plates in the rotation axis direction, and is fixed to an outer circumference of the main shaft 20. The rotor core 30 extends coaxially with the rotation axis. On the outer circumference of the rotor core 30, 40 convex-shaped (e.g., nearly rectangular in traverse cross section) salient pole sections 32 which are arranged in a circumferential direction at equal intervals to each other are formed. That is, a concave groove 34 is formed between adjacent salient pole sections 32.

In this example, the rotor core 30 has a length of 50 mm in the rotation axis direction and an outer radius (distance between a rotation axis center and leading end surfaces of the respective salient pole sections 32) of 255 mm.

The stator 40 includes a stator core 50, field windings 60 forming a plurality of poles, and three-phase armature windings 70 forming a plurality of poles, and the damper winding 75 (FIGS. 3 and 4).

The stator core 50 is formed by laminating a plurality of silicon steel plates in the rotation axis direction and is disposed around an outer circumference of the rotor 10 with an air gap formed therebetween. On the inner circumference of the stator core 50, 48 convex-shaped (e.g., substantially rectangular in traverse cross section) teeth 52 which are arranged in a circumferential direction at equal intervals from one another are formed. That is, a slot 54 is formed between two adjacent teeth 52.

In this example, the stator core 50 has a length of 50 mm in the rotation axis direction, an outer radius of 315 mm, and a radial direction thickness (distance between leading end surfaces of the respective teeth 52 and an outer circumferential surface of the stator core 50) of 59.5 mm. Further, the stator core 50 is disposed such that a distance of the air gap (distance between the leading end surfaces of the respective salient pole section 32 and the leading end surfaces of the respective teeth 52) is 0.5 mm.

On radial-direction inner sides of the teeth 52, axial-direction grooves 52a (FIGS. 3 and 4), which have openings at both axial-direction sides and radial-direction inner sides and which extend in the axial direction, are formed.

The field windings 60 are formed by winding conductive wires, such as copper wires, around each of the 48 teeth 52 which extends radially through an insulator, so as to form so-called "concentrated windings". Field windings 60 wound around adjacent teeth 52 are wound in an opposite direction and are connected in series to each other. To the field windings 60, field current is supplied from a DC power supply (not illustrated). Thus, in the present embodiment, the number of poles $p_f$ formed by the field windings 60 is 48, which is equal to the number of the teeth 52. The number of turns of the field windings 60 is 9,216.

The three-phase armature windings 70 are formed by winding conductive wires, such as copper wires, around each of the 48 teeth 52 which extend radially through an insulator, so as to form so-called "concentrated windings". The three-phase armature windings 70 are wound at an inward position in the radial direction relative to the position at which the field windings 60 are wound so as to be insulated from the field windings 60. The three-phase armature windings 70 wound around adjacent teeth 52 are wound in the same direction to each other.

The three-phase armature windings 70 includes three-phase (U-phase, V-phase, W-phase) windings which are star-connected to each other, and the windings of the U-phase, V-phase, W-phase are wound around the 48 teeth 52. These windings are arranged in the sequentially circumferential direction. Thus, the number of poles $p_a$ of the three-phase armature windings 70 is 32 (that is 48/3×2). The number of turns of the three-phase armature windings 70 is 528 for each phase.

The U-phase of the armature windings 70 includes a first U-phase part (U1 of FIGS. 3 and 4), and a second U-phase part (U2 of FIGS. 3 and 4). The first and the second of U-phase parts form different poles. The first U-phase part and the second U-phase part are wound around different teeth 52 each other.

The V-phase includes a first V-phase part (V1 of FIGS. 3 and 4), and a second V-phase part (V2 of FIGS. 3 and 4). The first and the second V-phase parts form different poles. The first V-phase part and the second V-phase part are wound around different teeth 52.

The W-phase includes a first W-phase part (W1 of FIGS. 3 and 4), and a second W-phase part (W2 of FIGS. 3 and 4). The first and the second W-phase parts form different poles.

The first W-phase part and the second W-phase part are wound around different teeth 52.

The damper winding 75 includes three conductor members, i.e. a first conductor member 85, a second conductor member 86, and a third conductor member 87; and three end rings, i.e. a first end ring 81, a second end ring 82, and a third end ring 83.

First, the configuration of the first conductor member 85 will be described.

The first conductor member 85 includes two long portions (a first U-phase portion 91 and a first V-phase portion 92), and one short portion (UV connection portion 93) that connects the long portions. The first U-phase portion 91, the first V-phase portion 92, and the UV connection portion 93 are formed integrally.

The first U-phase portion 91 is placed in an axial-direction groove 52a of a tooth 52 corresponding to the first U-phase of the armature winding. The first V-phase portion 92 is placed in an axial-direction groove 52a of a tooth 52 corresponding to the first V-phase. The UV connection portion 93 connects an end of the first U-phase portion 91 to an end of the first V-phase portion 92.

The other end of the first U-phase portion 91 that is opposite to the UV connection portion 93 is connected to the first end ring 81. The other end of the first V-phase portion 92 that is opposite to the UV connection portion 93 is connected to the second end ring 82. The way the above components are connected will be described later.

The configuration of the second conductor member 86 will be now described.

As in the case of the first conductor member 85, the second conductor member 86 includes two long portions (a first W-phase portion 94 and a second U-phase portion 95), and one short portion (WU connection portion 96) that connects the long portions. The first W-phase portion 94, the second U-phase portion 95, and the WU connection portion 96 are formed integrally.

The first W-phase portion 94 is placed in an axial-direction groove 52a of a tooth 52 corresponding to the first W-phase. The second U-phase portion 95 is placed in an axial-direction groove 52a of a tooth 52 corresponding to the second U-phase. The WU connection portion 96 connects one end portion of the first W-phase portion 94 to an end of the second U-phase portion 95.

The other end of the first W-phase portion 94 that is opposite to the WU connection portion 96 is connected to the second end ring 82. The other-side end portion of the second U-phase portion 95 that is opposite to the WU connection portion 96 is connected to the third end ring 83. The way the above components are connected will be described later.

The configuration of the third conductor member 87 will be described.

As in the case of the first conductor member 85, the third conductor member 87 includes two long portions (a second V-phase portion 97 and a second W-phase portion 98), and one short portion (VW connection portion 99) that connects the long portions. The second V-phase portion 97, the second W-phase portion 98, and the VW connection portion 99 are formed integrally.

The second V-phase portion 97 is placed in an axial-direction groove 52a of a tooth 52 corresponding to the second V-phase. The second W-phase portion 98 is placed in an axial-direction groove 52a of a tooth 52 corresponding to the second W-phase. The VW connection portion 99 connects one end portion of the second V-phase portion 97 to one end portion of the second W-phase portion 98.

The other-side end portion of the second V-phase portion 97 that is opposite to the VW connection portion 99 is connected to the third end ring 83. The other-side end portion of the second W-phase portion 98 that is opposite to the VW connection portion 99 is connected to the first end ring 81. The way the above components are connected will be described later.

The first end ring 81 will be now described.

The first end ring 81 is placed at one axial-direction outer side (upper side in FIG. 4) of axial-direction outer sides of the stator core 50. The first end ring 81 is partially annular in shape around the rotation axis, and is made of electric conductor. The first U-phase portion 91 and the second W-phase portion 98 are connected to an axial-direction surface (or surface facing the stator core 50) of the first end ring 81, as described above, and are conductive each other.

The second end ring 82 will be now described.

As in the case of the first end ring 81, the second end ring 82 is placed at one axial-direction outer side (upper side in FIG. 4) of axial-direction outer sides of the stator core 50. The second end ring 82 is a conductor that is partially annular in shape around the rotation axis, and is shorter in circumferential-direction length than the first end ring 81. The first W-phase portion 94 and the first V-phase portion 92 are connected to an axial-direction surface (or surface facing the stator core 50) of the second end ring 82, as described above, and are conductive each other.

The third end ring 83 will be now described.

As in the case of the first end ring 81, the third end ring 83 is placed at one axial-direction outer side (upper side in FIG. 4) of axial-direction outer sides of the stator core 50. The third end ring 83 is a conductor that is partially annular in shape around the rotation axis, and is shorter in circumferential-direction length than the first end ring 81. The second V-phase portion 97 and the second U-phase portion 95 are connected to an axial-direction surface (or surface facing the stator core 50) of the third end ring 83, as described above, and are conductive each other.

The first conductor member 85, the second conductor member 86, the third conductor member 87, the first end ring 81, the second end ring 82, and the third end ring 83 make up one closed electrical circuit. As described above, the one closed electrical circuit is disposed by the six teeth 52, or the teeth corresponding to the first U-phase, the second U-phase, the first V-phase, the second V-phase, the first W-phase, and the second W-phase. According to the present embodiment, there are 48 teeth 52, so there are eight closed electrical circuits.

Next, function of the present embodiment, that is, operation of the generator will be described. First, an operation principle of the generator will be described.

When the field windings 60 are excited by field current $I_f$ of direct current, a static magnetic field of $p_f$ poles (48 poles) is formed in the stator 40. The static magnetic field is denoted by a dashed line $L_1$ of FIG. 2. Then, the rotor 10 is driven at a rotating speed N [min$^{-1}$] (arrow $X_1$ in FIG. 2) by a power engine (not illustrated) provided outside the generator.

At this time, the static magnetic field is modulated in flux by the rotor 10 of $2 \times p_r$ poles (80 poles) obtained by the sum of the number of the salient pole sections 32 and the number of the concave grooves 34 (the salient pole sections and concave grooves are corresponding to N poles and S poles, respectively), and a rotating magnetic field of $p_a$ poles represented by the following equation (1) is generated. The rotating magnetic field is denoted by a continuous line $L_2$ of FIG. 2.

$$p_a = (2 \times p_r) - p_f \qquad \text{equation (1)}$$

In this example, $p_r=40$ and $p_f=48$, so that the number $p_a$ of poles is 32 (2×40−48), that is, 32-pole rotating magnetic field is generated.

In general, in a case where a speed-up device that speeds up the rotating speed mechanically is not used, the rotating magnetic field is uniquely determined by the field current $I_f$ and so on at a predetermined rotating speed. On the other hand, in the present embodiment, a size of the rotating magnetic field is larger than that determined by the field current $I_f$.

In this example, the 32-pole rotating magnetic field is corresponding to rotating field at a speed of 2.5 (=80 poles/32 poles) times the rotating speed N [min$^{-1}$] of the rotor 10 by the effect of the magnetic gear.

The rotating speed forming the rotating magnetic field is represented by $(2 \times p_r/p_f) \times N$, where N is a rotating speed to be actually input to the generator. When this expression is modified using the above equation (1), it is expressed as $(1+P_f/P_a) \times N$ (arrow $X_2$ in FIG. 2).

That is, the same effect as that obtained when a rotating speed of $(1+P_f/P_a)$ times the rotating speed to be input to the generator is input can be obtained. In this example, $p_a=32$ and $p_f=48$ are set such that a ratio between $p_a$ and $p_f$ satisfies a relationship: $p_f/p_a=1.5$, so that the rotating speed of 2.5 (1+48/32) times the rotating speed to be input to the generator can be obtained.

As a result, a three-phase AC current of a power generation frequency f [Hz] represented by the following equation (2) is induced in the armature windings 70.

$$f=(p_a/120) \times ((2 \times p_r)/p_a) \times N \quad \text{equation (2)}$$

Note that an induced voltage V to be induced to the three-phase armature windings 70 is easily controlled by adjusting the field current $I_f$ to be supplied to the field windings 60.

Next, effects of the rotating electrical machine according to the present embodiment will be described.

The rotor 10 of the present embodiment has 80 poles. The rotating magnetic field speeds up by 2.5 times by the effect of the magnetic gear. In general, a generator's output power is proportional to the rotating speed. However, according to the above effect, an output power per volume of 80-pole generator of this embodiment can be designed larger than that of a conventional 80-pole generator.

Further, although the generator of the present embodiment has the salient pole rotor having 80 poles, the field windings around the rotor poles are not needed, and power feeding to the rotor is not required. In addition, since the rotor 10 is configured as a salient pole rotor having a simpler structure, existing manufacturing technology can be used for manufacturing of the generator of the present embodiment. Thus, the present embodiment can obtain effect of the magnetic gear while preventing an increase in manufacturing cost of the generator and assembling man-hours.

The following describes operation of the damper winding 75 by making a comparison between when the damper winding 75 exists and when no damper winding 75 exists.

If the load torque that is input into the rotary electrical machine is constant, the mechanical rotation speed is constant. That is, the rotor 10 rotates at an almost constant rotation speed when there is no change in the load torque.

Figure 5:
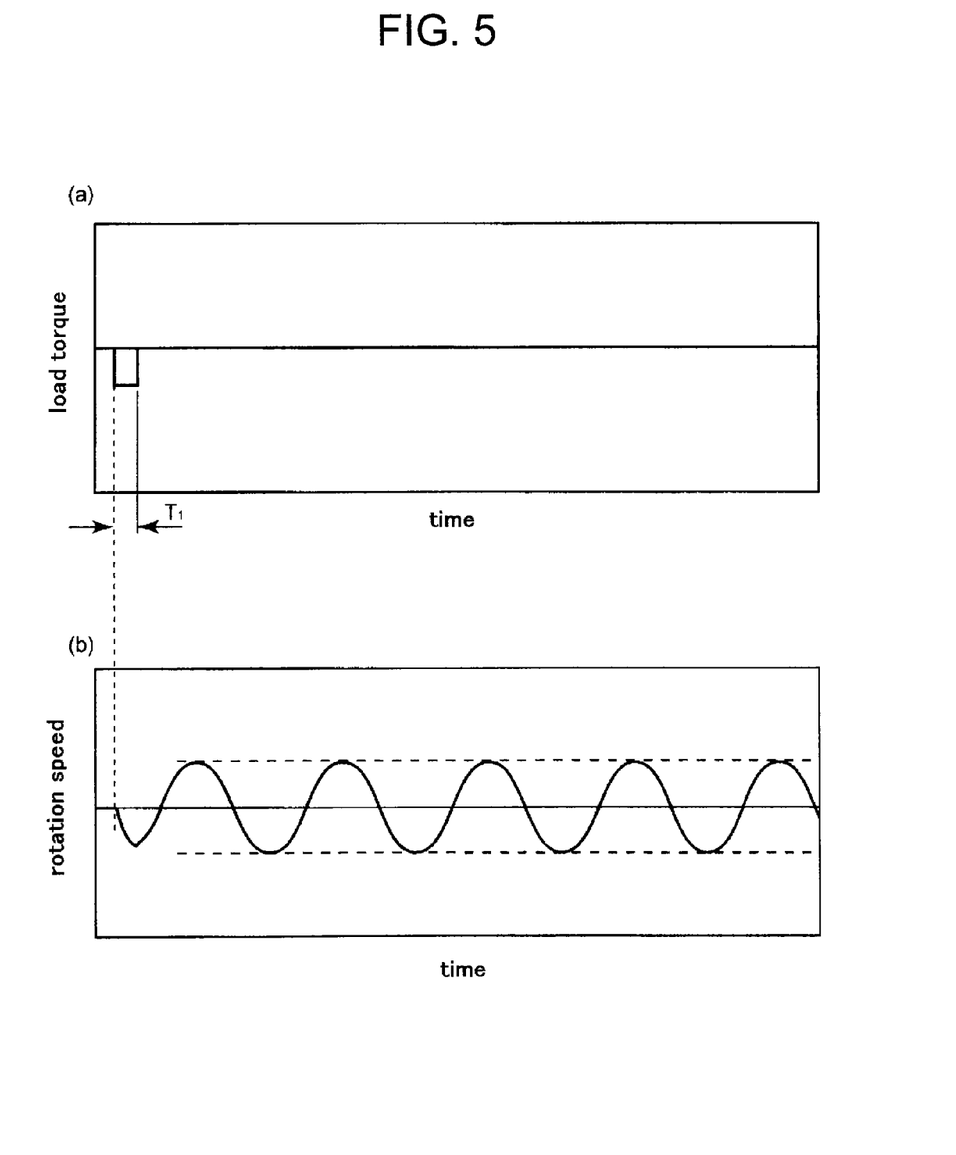
Figure 6:
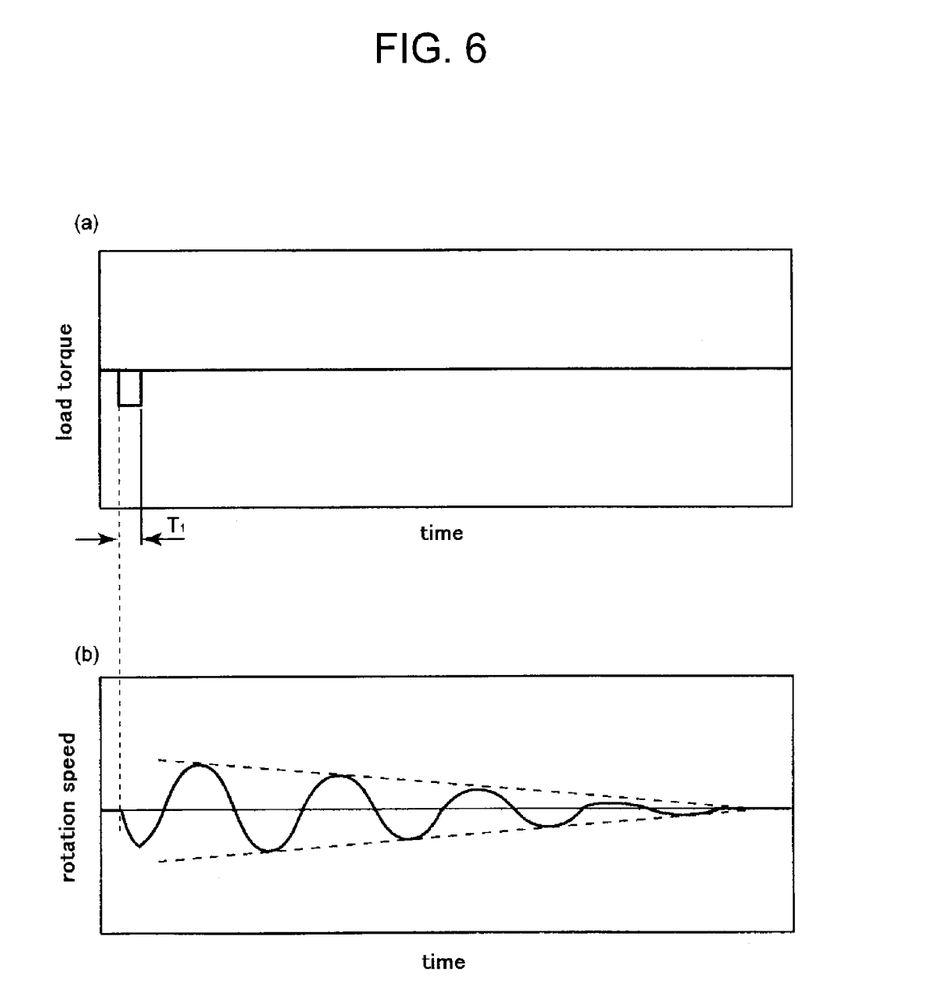

However, when the load torque of a predetermined magnitude is input in a short time, the rotation speed changes if there is no damper winding 75. In the example of FIGS. 5 and 6, a predetermined load torque is working during predetermined time period $T_1$.

Because of the load torque, the rotation speed of the rotor 10 changes as shown in FIG. 5(b). The reason is that as the load torque is generated, torque (changing torque) that changes the rotation of the rotor 10 is generated. At this time, the rotation state of the rotor 10 remains a changing state. The change in the rotation speed affects the rotating magnetic field, too. Therefore, the rotating magnetic field changes in a similar way to the rotation speed.

The following describes the case where the damper winding 75 exists.

When the change torque that changes the rotation speed is generated, current flows through each of the above eight closed electrical circuits. As the current flows through each of the electrical circuits, torque (braking torque) is so generated as to cancel the changing torque. Because of the braking torque, the change in the rotation speed of the rotor 10 becomes gradually smaller. After a certain time has passed, the change in the rotation speed goes down to almost zero.

In that manner, the damper winding 75 is provided. Therefore, even if the load torque is abruptly generated, the stable rotation speed can be maintained. As a result, the stable rotating magnetic field can be obtained.

As is clear from the above description, according to the present embodiment, it is possible to obtain effect of the magnetic gear in a rotating electrical machine having a simple structure.

Second Embodiment

Figure 7:
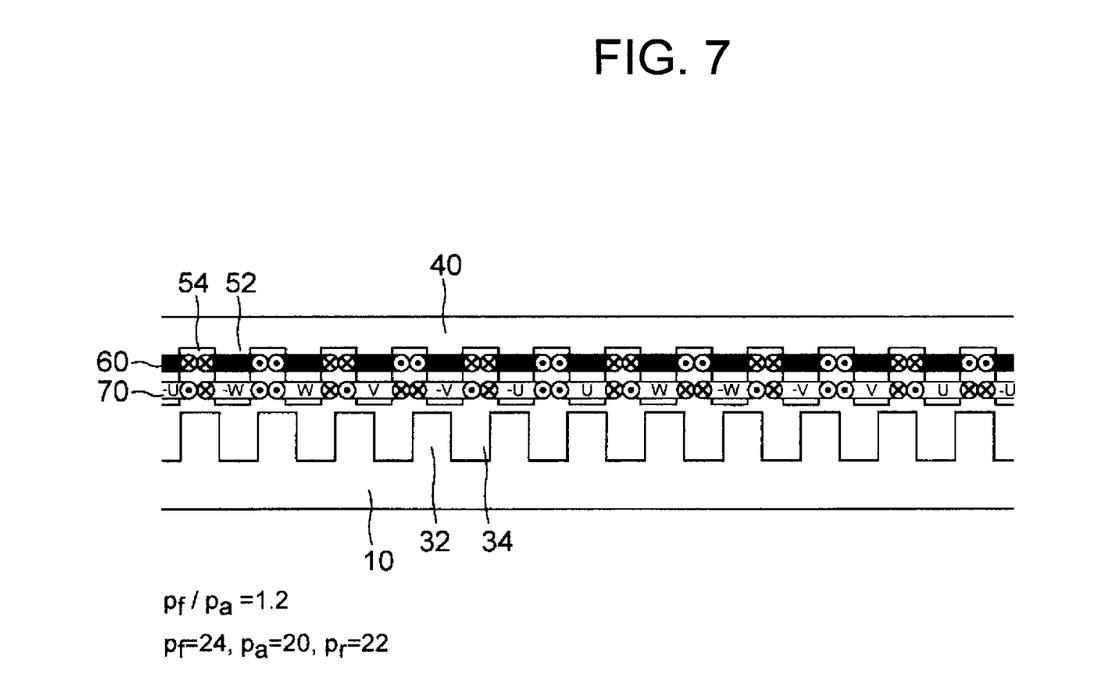
FIG. 7 is a schematic cross-sectional view of partially illustrating the stator and the rotor of the rotating electrical machine according to a second embodiment of the present invention, which is obtained by linearly developing the circumferential direction as viewed from the axial direction.

A second embodiment will be described using FIG. 7. FIG. 7 is a schematic cross-sectional view of partially illustrating the stator and the rotor 10, which is obtained by linearly developing the circumferential direction as viewed from the axial direction. FIG. 7 does not show a damper winding 75 and the like.

The present embodiment is a modification of the first embodiment (FIGS. 1 to 6), and the same reference numerals are given to the same or similar parts to those of the first embodiment, and the repeated description will be omitted.

In the present embodiment, the ratio between $p_a$ and $p_f$ satisfies a relationship: $p_f/p_a=1.2$. In this example, $p_a=20$ and $p_f=24$, so that the rotating speed is increased by 2.2 (=1+24/20) times.

Thus, as in the first embodiment, it is possible to obtain effect of the magnetic gear in a rotating electrical machine having a simple structure.

Third Embodiment

Figure 8:
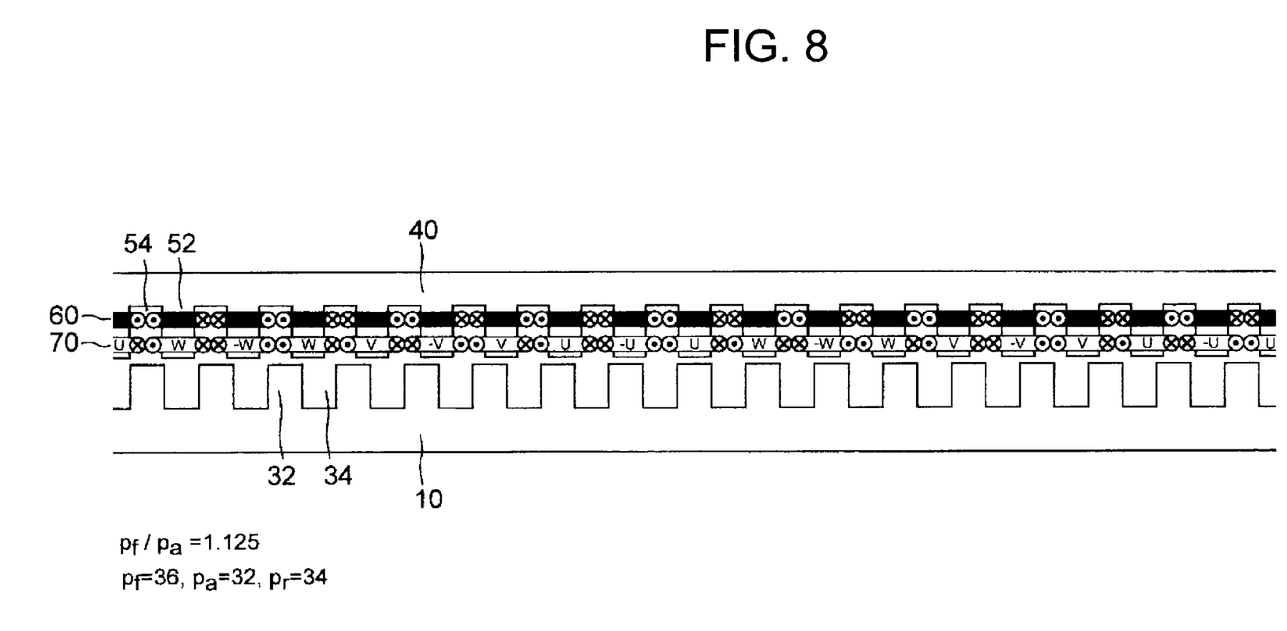
FIG. 8 is a schematic cross-sectional view of partially illustrating the stator and the rotor of the rotating electrical machine according to a third embodiment of the present invention, which is obtained by linearly developing the circumferential direction as viewed from the axial direction.

A third embodiment will be described using FIG. 8. FIG. 8 is a schematic cross-sectional view of partially illustrating the stator and the rotor, which is obtained by linearly developing the circumferential direction as viewed from the axial direction. FIG. 8 does not show a damper winding 75 and the like.

The present embodiment is a modification of the first embodiment (FIGS. 1 to 6), and the same reference numerals are given to the same or similar parts to those of the first embodiment, and the repeated description will be omitted.

In the present embodiment, the ratio between $p_a$ and $p_f$ satisfies a relationship: $p_f/p_a=1.125$. In this example, $p_a=32$ and $p_f=36$, so that the rotating speed is increased by 2.125 (=1+36/32) times.

Thus, as in the first embodiment, it is possible to obtain effect of the magnetic gear in a rotating electrical machine having a simple structure.

Other Embodiments

The embodiments described above are merely given as examples, and it should be understood that the present invention cited in claims is not limited thereto. Further, the configurations of respective components of the present invention are not limited to the above embodiments but may be variously changed within the technical scope of the claims.

The "$p_f/p_a$" are set to 1.5, 1.2, and 1.125, respectively, in the first to third embodiments, but not limited thereto.

Figure 9:
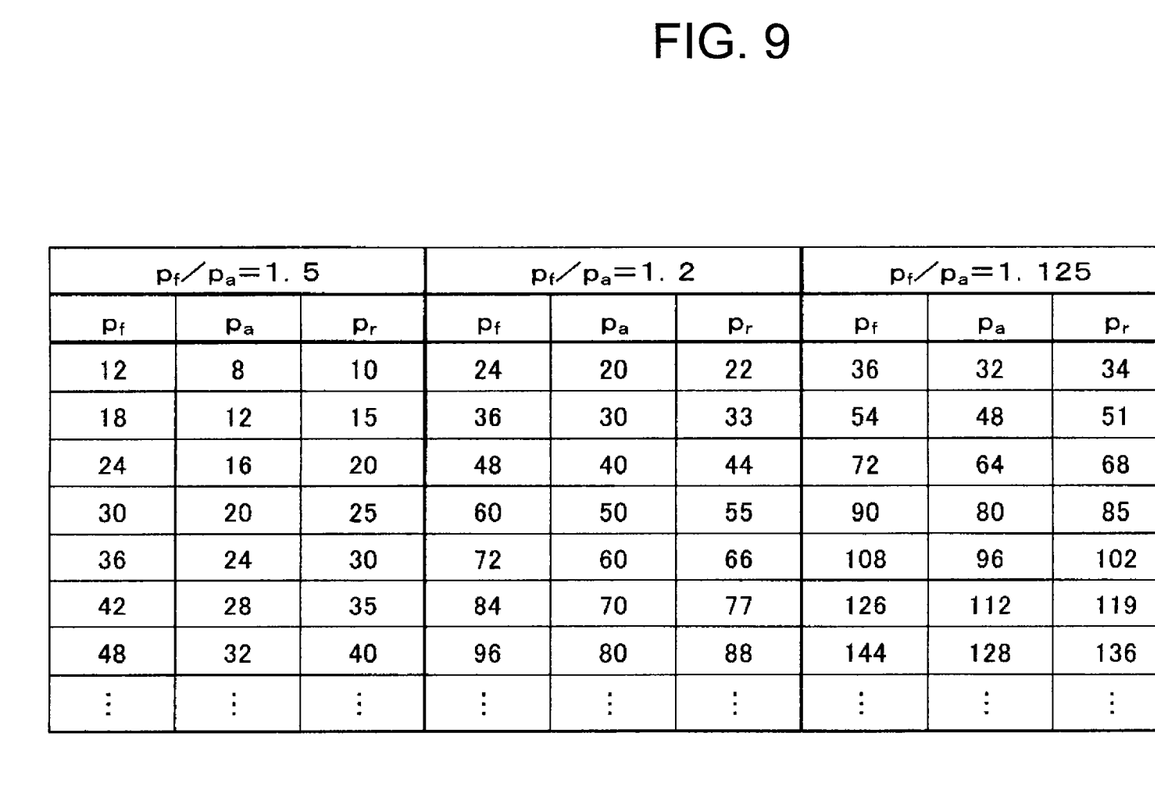
FIG. 9 is a table showing an example of a combination of $p_f$, $p_a$, and $p_r$ to be used in each embodiment of FIGS. 1, 3 and 4.

FIG. 9 is a table showing an example of a combination of $p_f$, $p_a$, and $p_r$ in each of the first to third embodiments. As shown in the table of FIG. 9, there exist a large number of combinations that satisfy "$p_f+p_a$"=$(2\times p_r)$ as that $p_f/p_a$ is 1.5, 1.2 or 1.125. Anyone of the combinations may be adopted. Then, a rotating magnetic field at a high speed can be generated from the salient poles of a rotor 10 rotated slowly. That is, a large output power can be obtained from a rotating machine having a comparatively small body.

Although the star-connection is adopted for the armature windings 70 in each of the first to third embodiments, a delta-connection may be adopted.

Although the armature windings 70 are wound at an inward position in the radial direction relative to a position at which the field windings 60 are wound in each of the first to third embodiment, the armature windings 70 may be wound at an outward position in the radial direction relative to a position at which the field windings 60 are wound.

The present invention may be applied to a phase modifier.

According to the first embodiment, the first U-phase portion 91, the first V-phase portion 92, and the UV connection portion 93, which make up the first conductor member 85 of the damper winding 75, are formed integrally. However, the present invention is not limited to that configuration. The first U-phase portion 91, the first V-phase portion 92, and the UV connection portion 93 may be different members, which are then assembled. The same is true for the second conductor member 86 and the third conductor member 87.

EXPLANATION OF REFERENCE SYMBOLS

10: rotor
20: main shaft
30: rotor core
32: salient pole section
34: concave groove
40: stator
50: stator core
52: tooth
52a: axial-direction groove
54: slot
60: field winding
70: armature winding
75: damper winding
81: first end ring
82: second end ring
83: third end ring
85: first conductor member
86: second conductor member
87: third conductor member
91: first U-phase portion
92: first V-phase portion
93: U-V connection portion
94: first W-phase portion
95: second U-phase portion
96: W-U connection portion
97: second V-phase portion
98: second W-phase portion
99: V-W connection portion

What is claimed is:

1. A rotating electrical machine comprising:
a rotor which is rotatably supported and which has, on its outer circumference, a plurality of convex-shaped salient pole sections arranged in a circumferential direction;
a stator core which is disposed around the outer circumference of the rotor with an air gap formed therebetween and which has, on its inner circumference, a plurality of convex-shaped teeth arranged in a circumferential direction, with axial-direction grooves that are formed on radial-direction inner sides of the teeth and open to radial-direction inner sides and both axial-direction sides and extend in the axial-direction;
field windings each of which is wound around each of the plurality of the teeth, each of the field windings forming a pole; and
armature windings each of which is wound around each of the plurality of the teeth so as to be insulated from the field windings, forming a plurality of poles,
a plurality of conductor rods that are disposed in each of the axial-direction grooves; and
a plurality of conductor connection members that are disposed on each of both sides of axial-direction outer sides of the rotor, and to each of which axial-direction end portions of a predetermined number of the conductor rods are connected, and which make up one closed electrical circuit along with a plurality of the conductor rods, wherein
the number of the teeth and the number of the poles formed by the field windings are equal, and
a ratio of the number of the poles formed by the field windings to the number of the poles formed by the armature windings is equal to a predetermined ratio, and the number of the salient pole sections formed in the rotor is equal to $(p_f+p_a)/2$, where $p_f$ is the number of the poles formed by the field windings, and $p_a$ is the number of the poles formed by the armature windings.

2. The rotary electrical machine according to claim 1, wherein:
the armature windings form three-phase windings of U-phase, V-phase, and W-phase on the teeth;
the U-phase includes a first U-phase part, and a second U-phase part of a different pole from the first U-phase part;
the V-phase includes a first V-phase part, and a second V-phase part of a different pole from the first V-phase part;
the W-phase includes a first W-phase part, and a second W-phase part of a different pole from the first W-phase part; and
the plurality of conductor connection members include:
a first connection member that connects a first end portion with one of the one-side end portion and other-side second end portion of the conductor rod disposed in the axial-direction groove of the teeth corresponding to the first U-phase part, and a first end portion of the conductor rod disposed in the axial-direction groove of the teeth corresponding to the first V-phase part,
a second connection member that connects a second end portion of the conductor rod disposed in the axial-direction groove of the teeth corresponding to the first V-phase part, and a second end portion of the conductor rod disposed in the axial-direction groove of the teeth corresponding to the first W-phase part, a third connection member that connects a first end portion of the conductor rod disposed in the axial-direction groove of the teeth corresponding to the first W-phase part, and a first end portion of the conductor rod disposed in the axial-direction groove of the teeth corresponding to the second U-phase part, a fourth connection member that connects a second end portion of the conductor rod disposed in the axial-direction groove of the teeth corresponding to the second U-phase part, and a second end portion of the conductor rod disposed in the axial-direction groove of the teeth corresponding to the second V-phase part, a fifth connection member that connects a first end portion of the conductor rod disposed in the axial-direction groove of the teeth corresponding to the second V-phase part, and a first end portion of the conductor rod disposed in the axial-direction of the teeth corresponding to the second W-phase part, and a sixth connection member that connects a second end portion of the conductor rod disposed in the axial-direction groove of the teeth corresponding to the second W-phase part, and the second end portion of the conductor rod disposed in the axial-direction groove of the teeth corresponding to the first U-phase part.

3. The rotary electrical machine according to claim 2, wherein:

the first connection member, the conductor rod that is disposed in the axial-direction groove of the teeth corresponding to the first U-phase part, and the conductor rod that is disposed in the axial-direction groove of the teeth corresponding to the first V-phase part are formed integrally;

the third connection member, the conductor rod that is disposed in the axial-direction groove of the teeth corresponding to the first W-phase part, and the conductor rod that is disposed in the axial-direction groove of the teeth corresponding to the second U-phase part are formed integrally; and the fifth connection member, the conductor rod that is disposed in the axial-direction groove of the teeth corresponding to the second V-phase part, and the conductor rod that is disposed in the axial-direction groove of the teeth corresponding to the second W-phase part are formed integrally.

4. The rotating electrical machine according to claim 1, wherein a rotating magnetic field is generated corresponding to that obtained by assuming that the rotor is rotated at a speed of $(1+p_f/p_a)$ times the actual rotating speed of the rotor.

5. The rotating electrical machine according to claim 1, wherein a relationship between the number of the poles formed by the field windings and the number of the poles of the armature windings satisfies $p_f/p_a=.5$.

6. The rotating electrical machine according to claim 1, wherein a relationship between the number of poles formed by the field windings and the number of poles of the armature windings satisfies $p_f/p_a=1.2$.

7. The rotating electrical machine according to claim 1, wherein a relationship between the number of poles formed by the field windings and the number of poles of the armature windings satisfies $p_f/p_a=1.125$.

* * * * *